United States Patent [19]

MacDonald et al.

[11] Patent Number: 5,132,399

[45] Date of Patent: Jul. 21, 1992

[54] COLOR OF TALL OIL FRACTIONS BY TREATING SOAP SKIMMINGS

[75] Inventors: Charles M. MacDonald, Savannah, Ga.; Richard R. Suchanec, Newark, Del.

[73] Assignee: Hercules Incorporated, Del.

[21] Appl. No.: 738,397

[22] Filed: Jul. 31, 1991

[51] Int. Cl.$^5$ ................................................ C09F 1/00
[52] U.S. Cl. .................................... 530/208; 530/205; 530/230
[58] Field of Search ............... 530/205, 206, 207, 208, 530/230, 232, 216

[56] References Cited

U.S. PATENT DOCUMENTS 1,887,246  11/1932  Pyhala .................................. 530/208

*Primary Examiner*—John Kight, III
*Assistant Examiner*—Richard Lee Jones
*Attorney, Agent, or Firm*—Joanne W. Patterson

[57] ABSTRACT

The color and color stability of tall oil fractions are improved and the odor and sulfur content are reduced by treating the heated black liquor soap skimmings prior to acidulation with 1.0 to 1.5 wt. % hydrogen peroxide for at least one minute.

5 Claims, No Drawings

COLOR OF TALL OIL FRACTIONS BY TREATING SOAP SKIMMINGS

This invention relates to a process for improving the properties of tall oil fatty acid and tall oil rosin fractions.

Spent black liquor from the sulfate or kraft process for the manufacture of paper is concentrated until the sodium salts (soaps) of the various organic acids that are present separate out and are skimmed off. The heated salts are acidified with sulfuric acid to form crude tall oil. The crude tall oil is then dewatered and depitched to form depitched tall oil, which in turn is fractionated to obtain tall oil fatty acid and tall oil rosin fractions.

Light color and color stability are important characteristics for commercial acceptance of these tall oil fractions. Tall oil fatty acids, which consist primarily of oleic and linoleic acids, are typically used in food grade applications. Tall oil rosin derivatives, particularly esters of polyols such as glycerol and pentaerythritol, are used in products such as adhesives, lacquers and varnishes where a light colored product that retains its color under normal conditions of use is required.

It is known to use hydrogen peroxide to treat derivatives made from tall oil fatty acid and tall oil rosin fractions obtained by fractionation of crude tall oil. For example, U.S. Pat. No. 2,630,426 discloses a method for treating rosin soaps with hydrogen peroxide to increase their effectiveness as emulsifying agents in emulsion polymerization of unsaturated organic compounds. U.S. Pat. No. 2,954,369 discloses treating polyethenoxy esters of rosin acids and tall oil acids with hydrogen peroxide and then treating the ester in liquid form with ozone to increase light transmittancy and detergency. However, no process has been disclosed for bleaching the soap skimmings with hydrogen peroxide.

As a result of the process of this invention one obtains a lighter colored pitch with unique tack qualities for adhesive opportunities; a tall oil fatty acid with lighter color, lower sulfur content and lower unsaponifiable levels; and a tall oil rosin with lighter color, lower sulfur content and enhanced oxidative and thermal stability.

In the process of this invention for preparing tall oil fractions by acidulating heated black liquor soap skimmings to produce crude tall oil, dewatering and depitching the crude tall oil to produce depitched tall oil, and fractionating the depitched tall oil, the improvement comprises improving the color and color stability and reducing the odor and sulfur content of the tall oil fractions by bleaching the soap skimmings prior to acidulation with 1.0 to 1.5% by weight hydrogen peroxide, based on the weight of the soap skimmings, for at least one minute.

The hydrogen peroxide used in the process of this invention can be purchased commercially in the form of an aqueous solution, typically 35 or 50 wt. % $H_2O_2$. When the process is carried out on a large scale, a metered amount of the aqueous hydrogen peroxide is introduced axially into the middle of the flowing soap to maintain a 1.0 to 1.5 wt. % level of $H_2O_2$. The soap skimmings and peroxide are thoroughly mixed by an in-line static mixer and a length of reactor pipe to provide at least one minute reaction time before acidulation. About two minutes is preferred. The reaction temperature is typically 65° to 90° C. and depends upon the flow rate of the soap and the residence time in the reaction pipe.

Such a process used at the soap skimmings stage results in reaction of the peroxide with lignin, phenolics and other aromatic color bodies and color precursors to produce a lighter colored crude tall oil. This process is referred to throughout the specification as bleaching. The light color persists through all of the subsequent steps in the process for obtaining tall oil fractions and for preparing derivatives thereof by subsequent reactions such as esterification, disproportionation, adduction and polymerization.

The peroxide also reacts with the sulfur species in the soap skimmings, converting many noxious sulfur compounds to oxidized, water-soluble species that will reduce environmental odor problems at the pulp mill and the sulfur content of the crude tall oil supplied to the fractionator. In addition, the fractionation of the crude tall oil proceeds more efficiently, since some of the impurities have already been removed by the bleaching process.

EXAMPLE 1

The improvement in the color of bleached soap skimmings compared with that of an unbleached control is shown in Table I. Samples of commercially available black liquor soap skimmings that are heated to 60° to 65° C. are treated with the wt. % $H_2O_2$ indicated in Table I for 1 to 2 minutes. Aqueous solutions (20 wt. %) of the bleached soap skimmings are then prepared and the color measured using a Pacific Scientific tristimulus unit. L is a measure of transparency (high values are better), a is a measurement of redness (low values are better), b is a measure of yellowness (low values are better) and YI is the yellowness index (lower values indicate lighter color).

TABLE I

| % $H_2O_2$ | 0 | 0.5 | 1.0 | 1.5 | 2.0 |
|---|---|---|---|---|---|
| L | 41.08 | 57.79 | 68.08 | 71.70 | 72.51 |
| a | 23.69 | 14.77 | 7.55 | 4.47 | 3.99 |
| b | 27.87 | 37.62 | 42.57 | 43.81 | 44.00 |
| YI | 162.45 | 134.59 | 119.62 | 113.61 | 112.35 |

At 2 wt. % $H_2O_2$, the color improvement is only marginally better than at 1.5%, but a lower abietic acid level is noted, indicating an unnecessary excess of $H_2O_2$. Any light color due to water dilution alone is minimal at all levels of aqueous peroxide.

EXAMPLE 2

Commercially available soap skimmings are treated in the laboratory with 1.5 wt. % $H_2O_2$ for about 1 to 2 minutes at 65° C. and acidified with $H_2SO_4$ until the aqueous layer has a pH of about 4.7 to produce bleached crude tall oil (CTO). The CTO is distilled at reduced pressure in the laboratory at a 25% pitch cut to obtain bleached depitched tall oil (DPTO), which is further fractionated to obtain a 15% light end cut, a 25% bleached tall oil fatty acids (TOFA) cut and a 35% bleached bottoms tall oil rosin (BTMS TOR) cut. The color of the bleached products in 50% toluene solutions is compared with the color of the following controls using a Pacific Scientific tristimulus unit: crude tall oil supplied by Stone Container Corp., depitched tall oil supplied by British Columbia Corp., PAMAK ® 4 tall oil fatty acids supplied by Hercules Incorporated and bottoms tall oil rosin supplied by Westvaco Corp. The Gardner color is also recorded. The data are shown in Table II. In all cases there is a reduction in the a-value (lower redness) and b-value (lower yellowness). The BTMS TOR produces a pentaerythritol resin of comparable color and color stability compared with a resin based on a premium grade commercial tall oil rosin.

bleached and unbleached CTO are distilled in the laboratory to obtain depitched tall oil (DPTO) as described in Example 2. The acid number of the bleached DPTO is 182.7 and that of the unbleached control is 173.1. The

TABLE II

|   | CTO Control | Bleached CTO* | DPTO Control | Bleached DPTO | TOFA Control | Bleached TOFA | BTMS TOR Control | Bleached BTMS TOR |
|---|---|---|---|---|---|---|---|---|
| L | 7.72 | — | 77.31 | 93.51 | 81.95 | 93.84 | 80.40 | 87.80 |
| 8a | +13.27 | — | −0.85 | −9.30 | −4.33 | −9.72 | −2.34 | −9.45 |
| b | 4.96 | — | 44.93 | 24.24 | 54.40 | 23.88 | 43.57 | 37.86 |
| YI | 237.93 | — | 103.03 | 39.19 | 71.19 | 38.04 | 94.73 | 69.32 |
| Gardner | 18 | — | 10+ | 5− | 7− | 5− | 9+ | 6+ |

*Interference from water.

EXAMPLE 3

A large scale batch of commercially available black liquor soap skimmings is treated with 1% $H_2O_2$ at 65° C. for 1 to 2 minutes. A sample of the bleached soap skimmings is acidified in the laboratory as described in Example 2 to produce bleached crude tall oil (CTO). The CTO is distilled in the laboratory to obtain bleached depitched tall oil (DPTO), which is further fractionated to obtain bleached tall oil fatty acids (TOFA) and bleached bottoms tall oil rosin (BTMS TOR) as described in Example 2. All of the DPTO, TOFA and TOR samples produced in the laboratory as well as DPTO, TOFA and TOR obtained from three different manufacturing facilities are analyzed for sulfur content using the Dohrmann coulometric method. The data are given in Table III. The level of sulfur in the DPTO, TOFA and TOR from the bleached CTO is greatly improved compared to typical levels in the DPTO, TOFA and TOR obtained from the manufacturing facilities. Distillation of the bleached CTO on an industrial scale rather than in the laboratory would be expected to lower the sulfur level still farther.

TABLE III

| | Dohrmann Coulometric Sulfur (PPM) | | |
|---|---|---|---|
| | DPTO | TOFA | TOR |
| Bleached CTO | 106 | 77 | 128 |
| Plant #1 | 660 | 120 | 840 |
| Plant #2 | 470 | 230 | 700 |
| Plant #3 | 530 | 100 | 740 |

EXAMPLE 4

A portion of a sample of commercially available black liquor soap skimmings is treated with 1.5 wt. % $H_2O_2$ and acidified in the laboratory as described in Example 2 to produce bleached crude tall oil (CTO). Another portion of the soap skimmings is acidified in the same manner but is not treated with $H_2O_2$. Both the bleached and unbleached CTO are distilled in the laboratory to obtain depitched tall oil (DPTO) as described in Example 2. The acid number of the bleached DPTO is 182.7 and that of the unbleached control is 173.1. The color of a 50% toluene solution of the bleached DPTO is compared to that of the unbleached DPTO control, both fresh and after holding at 100° C. for one week. A Pacific Scientific tristimulus unit is used for the color comparisons and the Gardner color is also recorded. The data are shown in Table IV. The color of the bleached DPTO is slightly better than the unbleached control when fresh, but exhibits a definite improvement in color stability after heat aging.

TABLE IV

| | Unbleached DPTO | | Bleached DPTO | |
|---|---|---|---|---|
| Color | Fresh | Wk @ 100° C. | Fresh | Wk @ 100° C. |
| L | 85.69 | 71.98 | 89.70 | 85.63 |
| a | −6.46 | +2.82 | −8.75 | −4.71 |
| b | 34.34 | 40.11 | 31.99 | 40.59 |
| YI | 66.19 | 102.33 | 56.73 | 80.73 |
| Gardner | 7 | 11− | 6− | 8− |

I claim:

1. In a process for preparing tall oil fractions by acidulating heated black liquor soap skimmings to produce crude tall oil, dewatering and depitching the crude tall oil to produce depitched tall oil and fractionating the depitched tall oil, the improvement comprising improving the color and color stability and reducing the odor and sulfur content of the tall oil fractions by bleaching the heated soap skimmings prior to acidulation by treating with 1.0 to 1.5 wt. % hydrogen peroxide, based on the weight of the soap skimmings, for at least one minute.

2. The process of claim 1 wherein the bleaching is continued for at least two minutes.

3. The process of claim 1 wherein the soap skimmings are heated to 65° to 90° C.

4. The process of claim 1 wherein the tall oil fraction is a tall oil fatty acid fraction.

5. The process of claim 1 wherein the tall oil fraction is a tall oil rosin fraction.

* * * * *

UNITED STATES PATENT AND TRADEMARK OFFICE
CERTIFICATE OF CORRECTION

PATENT NO. : 5,132,399

DATED : July 21, 1992

INVENTOR(S) : Charles M. MacDonald and Richard R. Suchanec

It is certified that error appears in the above-identified patent and that said Letters Patent is hereby corrected as shown below:

On the Title page, item [54],

The formal title of the patent on the Title page and at the top of Column 1 should be corrected from "Color of Tall Oil Fractions By Treating Soap Skimmings" to read "Improving The Color of Tall Oil Fractions By Treating Soap Skimmings"; and Col. 3, Table II, first column, "8a" should read "a".

Signed and Sealed this

Seventeenth Day of August, 1993

*Attest:*

BRUCE LEHMAN

*Attesting Officer*  Commissioner of Patents and Trademarks